Oct. 31, 1961   J. R. ZEMAN   3,006,101
SPRING-RESPONSIVE FISH HOOK
Filed Dec. 24, 1959

Jack R. Zeman
INVENTOR.

BY *Clarence A O'Brien*
*and Harvey B. Jacobson*
Attorneys

United States Patent Office 3,006,101
Patented Oct. 31, 1961

3,006,101
SPRING-RESPONSIVE FISH HOOK
Jack R. Zeman, 2741 NE. 10th Ave.,
Fort Lauderdale, Fla.
Filed Dec. 24, 1959, Ser. No. 861,887
4 Claims. (Cl. 43—36)

The present invention relates to a fish hook which is provided with a structurally and functionally distinct spring which is responsive to action when a strike is made and functions to forcibly set the hook in the mouth of the fish in a manner to assure the desired catch.

This spring is ellipsoidal, generally visualized, in plan and embodies a pair of duplicate longitudinally bowed limbs which converge to and provide a penetrating point which is forcibly triggered into action and embeds itself in the mouth of the fish. The limbs straddle the shank of the fish hook and the motive force which trips the spring is inherent in the resilient properties of the spring, particularly the limbs. One of the limbs is adapted to releasably engage a coacting portion of the shank whereby when a strike is made the desired tripping and hook-embedding result is accomplished.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
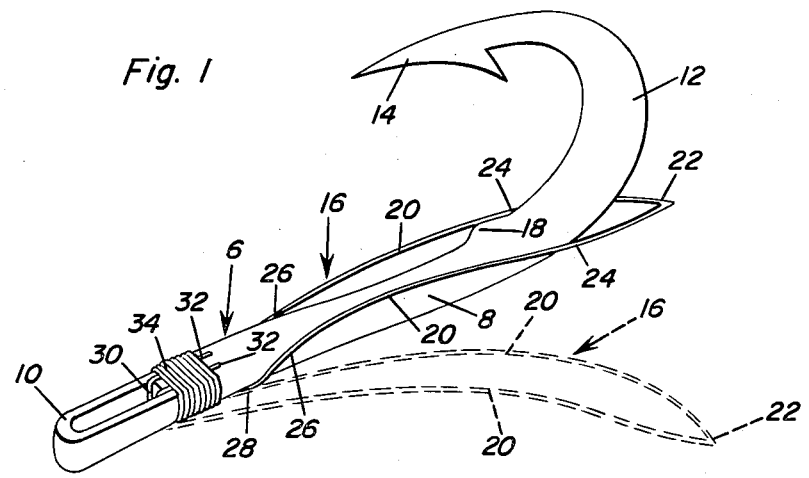
FIG. 1 is a view in perspective of a spring-loaded strike-responsive fish hook constructed in accordance with the principles of the invention and showing the same set in full lines and sprung in phantom lines.
Figure 2:
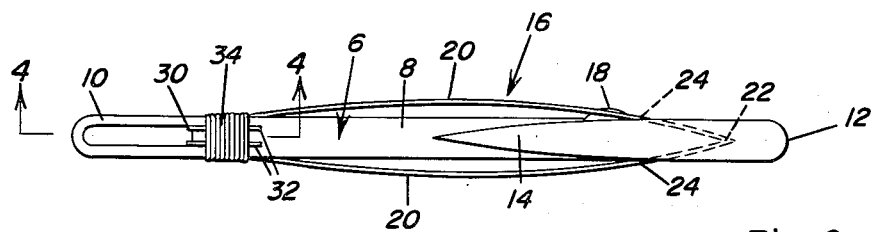
FIG. 2 is a top plan view of the construction shown in FIG. 1.

The illustrated fish hook 6 comprises a rigid shank 8 having an eye 10 at one end and a hook at the other end. The hook is provided with a return bend 12 having a terminal barb 14, and to coact with the strike-released and latchable spring 16 I employ a detent in the form of a simple lug 18 formed integrally with a median portion of the shank adjacent the return bend 12. This lug is rounded to serve as a retaining and releasing cam. The cam surfaces facilitate setting the spring for strike-responsive action.

Figure 4:
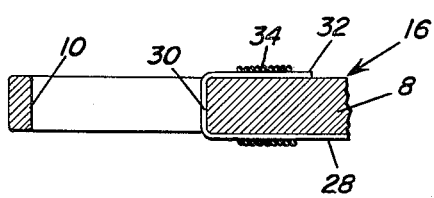
FIG. 4 is a section on the line 4—4 of FIG. 2.

The spring 16 is of resilient wire of requisite grade and is preferably non-corodable spring steel and in plan the spring is an ellipsoidal loop. The longitudinal limbs 20 are bowed lengthwise and come together beyond the hook end of the shank 8 with a joint to form a V-shaped penetrating point 22 which functions in a path of operation beyond the bent portion 12. Adjacent the point the limb portions 24 straddle the shank, one of these portions becoming a trigger for releasable engagement with the setting and retaining lug or detent 18. Other portions 26 of the limbs extend beneath (FIG. 1) the shank adjacent the eye as at 28 and they are then bent up at 30 (FIG. 4) and across to extend through the space of the eye and the terminal portions 32 are bent parallel to the portions 28 and secured in place. Various methods of attaching the end portions to snell the same in place may be resorted to, for instance, by soldering, wrapping with copper wire 34 in the manner shown, welding, clamping or otherwise attaching the same.

In operation it will be seen that the portion 24 of one limb 20, to the left, as shown in FIG. 1, is engaged over the detent 18 and the detent becomes a retaining shoulder for the time being. The over-all spring 16 is consequently placed under pressure inasmuch as the natural tendency is for the spring to spring from the full line to the dotted line position illustrated. Also, it will be evident that the penetrating point 22 takes the cocked position illustrated. It follows that when a strike is made the slightest shifting movement of the pointed tripping spring brings the spring forcibly into action. The motive power generated causes the two "hooks" 14 and 22 to spring or spread apart and to embed and set themselves in the flesh of the mouth of the fish in a seemingly obvious manner.

Figure 3:
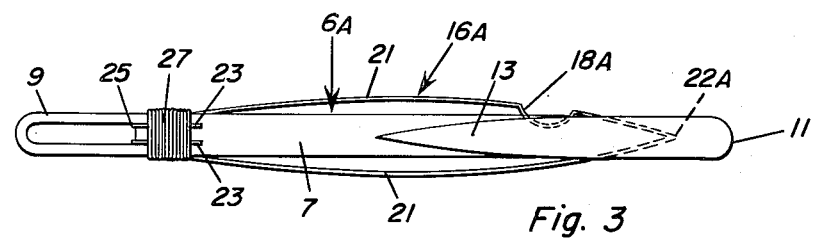
FIG. 3 is likewise a plan view but showing a modified releasable trip construction.

Referring now to FIG. 3, the hook 6A therein shown embodies a shank 7, an eye 9, a bent end portion 11 and a barbed hook 13. The stainless steel loop-type spring 16A is virtually the same as the one already shown and described and includes longitudinally bowed limbs 21 with terminal end portions 23 passing through the eye as at 25 and secured in place at 27. The point which corresponds with the point 22 is here designated as at 22A. The detent means 18A comprises an inwardly extending crimp in the form of a semi-circular bend or bent portion which constitutes a trigger or detent and which is releasably cooperable with the shank 7. The setting of this "trap" is the same as that already described and so is the mode of operation. FIG. 3 shows the motive power reaction spring 16A in the ready-to-function position.

It will be evident that with this spring-loaded hook the manufacturer will not necessarily have to appreciably increase the proportionate size of the hook. Nor does it prevent the use of either fishing with a baited or an unbaited hook. It follows therefore that the construction is such as to provide a definite advance in the art which as intended accomplishes the desired aims in a satisfactory and acceptable manner. This is largely attributable to the employment with a rigid shank having an eye in one end and at the other a return bend forming a hook whose point is faced generally toward the eye end of the shank, of an elongated spring anchored at one end to the shank near its eye end and biased to advance its opposite free end portion away from the shank and hook thereon. The spring comprises two resilient limbs separated from each other to lie along opposite sides of the shank and of its return bend beyond which the limbs are united to form a point facing oppositely of the point on the shank hook. Flexing movements of the spring free end portion are confined by its two-limb structure to a plane which is common with that of the return bend of the shank.

What is claimed as new is as follows:

1. A fish hook comprising a rigid shank having an eye at one end and at its other end a return bend terminating in a hook point facing generally toward the eye of the shank, and an elongated wire spring having two resilient limbs lying alongside opposite sides of the shank and joined to each other at one end of the spring to form an impaling point facing oppositely of the shank hook point and disposed divergingly away therefrom, end portions of the two limbs oppositely of the spring impaling point being extended through the eye of the shank for fixed anchorage thereto whereby to confine the free end portion of the spring to movements toward and from the shank in a plane common with the return bend thereof, and pressure-responsive interengaging means on the shank and spring near the free end portion of the latter for releasably holding the spring in a retracted tensioned position with its impaling point at minimum distance from the hook of the shank.

2. A fish hook comprising a rigid shank having an eye at one end and at its other end a return bend terminating in a hook point facing generally toward the eye end of the shank, and an elongated spring lying alongside the shank and formed at one end with an impaling point facing oppositely of the shank hook point and disposed outwardly therebeyond and biased to advance its impaling point divergingly away from the shank, means for restraining flexing movements of the spring to a plane transversely of that occupied by the shank hook, means fixedly anchoring the opposite spring end to the shank at a point adjacent its eye whereby to permit flexing of the free end portion of the spring toward and from the shank hook near a plane common therewith, and pressure-responsive interengaging means on the shank and spring in the free end portion of the latter for releasably holding the spring in a retracted tensioned position with its impaling point at minimum distance from the hook of the shank.

3. A fish hook comprising a rigid shank having an eye at one end and at its other end a return bend terminating in a hook point facing generally toward the eye end of the shank, and an elongated spring comprising two spaced apart resilient limbs disposed alongside opposite sides of the shank but united at one end beyond the return bend of the shank to provide an impaling point facing in a direction oppositely of the shank hook point, means fixedly anchoring the opposite limb ends of the spring to the shank at a point adjacent its eye, the spring being biased to flex away from the shank to advance its free end portion into diverging relation thereto, the flexing movements of the spring being confined by its spaced apart limbs to a plane common with that of the return bend of the shank, and pressure-responsive means for releasably holding the free end portion of the spring in retracted position adjacent the shank.

4. A fish hook in accordance with claim 3 wherein one of the resilient limbs is inwardly crimped toward the shank normally to engage therewith whereby to provide a detent acting to hold the spring releasably in its retracted position.

References Cited in the file of this patent
UNITED STATES PATENTS

| | | |
|---|---|---|
| 51,651 | Davis et al. | Dec. 19, 1865 |
| 712,032 | Baker | Oct. 28, 1902 |
| 882,882 | Henzel | Mar. 24, 1908 |
| 1,649,140 | Steffans | Nov. 15, 1927 |